(12) United States Patent
Moore et al.

(10) Patent No.: US 7,822,811 B2
(45) Date of Patent: Oct. 26, 2010

(54) PERFORMANCE ENHANCEMENTS FOR VIDEO CONFERENCING

(75) Inventors: Tim M. Moore, Bellevue, WA (US); Dalibor Kukoleca, Redmond, WA (US); Wei Zhong, Issaquah, WA (US); Warren V. Barkley, Mill Creek, WA (US); Danny Levin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 11/454,593

(22) Filed: Jun. 16, 2006

(65) Prior Publication Data

US 2007/0294346 A1    Dec. 20, 2007

(51) Int. Cl.
G06F 15/16 (2006.01)
H04N 7/14 (2006.01)

(52) U.S. Cl. .................................. 709/204; 348/14.08

(58) Field of Classification Search .................. 709/204, 709/205, 207; 713/160; 370/263; 348/14.01–14.16; 375/240.01–240.29
See application file for complete search history.

(56) References Cited

U.S. PATENT DOCUMENTS

| | | | | |
|---|---|---|---|---|
| 5,508,942 A | * | 4/1996 | Agarwal | ..................... 709/204 |
| 5,805,705 A | * | 9/1998 | Gray et al. | ................... 713/160 |
| 6,128,649 A | * | 10/2000 | Smith et al. | .................. 709/217 |
| 6,795,106 B1 | | 9/2004 | Cooper | |
| 6,804,781 B1 | | 10/2004 | Castro | |
| 6,989,856 B2 | | 1/2006 | Firestone et al. | |
| 2003/0063574 A1 | * | 4/2003 | Virolainen | ................... 370/260 |
| 2005/0169312 A1 | * | 8/2005 | Cakareski et al. | ........... 370/473 |
| 2006/0067251 A1 | | 3/2006 | Hagendorf | |

FOREIGN PATENT DOCUMENTS

| | | | |
|---|---|---|---|
| JP | 11177953 A | | 7/1999 |
| WO | WO 03015417 A1 | * | 2/2003 |
| WO | WO 03065720 A1 | * | 8/2003 |

OTHER PUBLICATIONS

International Search Report dated Aug. 6, 2007 for Application No. PCT/US2007/004644, 10 pages.

* cited by examiner

*Primary Examiner*—Joseph E Avellino
*Assistant Examiner*—Peter Shaw (57) ABSTRACT

A conference server may request a key frame from a conference participant in response to determining that the conference participant should become a most active participant, and the conference server may make the conference participant the most active participant in response to receiving the key frame from the conference participant.

20 Claims, 4 Drawing Sheets

PERFORMANCE ENHANCEMENTS FOR VIDEO CONFERENCING

BACKGROUND

Conferencing servers typically accept information from multiple participants in a conferencing session and process and direct the information back out to the participants. One example of a conferencing server is an audio/video conferencing server. An audio/video conferencing server typically accepts audio and/or video streams from multiple conference participants, mixes the audio, and selects the video stream for one or more of the participants for display to the other participants. A participant selected for viewing by the other participants is sometimes referred to as a most active participant, because they may be a participant that is talking the loudest or otherwise 'has the floor'.

Performance is a major issue in the design and operation of conferencing servers, especially audio/video conferencing servers. As more participants join a conference, an increasing burden is placed on the conferencing server to provide audio mixing, video decoding and encoding, bandwidth scaling, encryption, and decryption.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

To accelerate the switch of video display to a new most active participant, and thus improve performance, a conference server may request a key frame from at least one conference participant in response to determining that the conference participant should become at least one most active participant. The conference server may make the conference participant the most active participant in response to receiving all or substantially all of the key frame.

To further improve performance, the conference server may decrypt only a small portion of each of one or more stream packets in order to determine a type and extent of one or more stream frames. The conference server may drop frames from the stream in order to perform bandwidth scaling appropriate to one or more conference participants. The conference server may decrypt a small portion of video metadata information, and drop frames identified from the metadata in lieu of decoding and re-encoding the stream at a lower bit rate. In this manner, the performance of the conference server may be improved by limiting the amount of decoding and re-encoding needed to perform bandwidth scaling to participants having low-bandwidth connections to the server.

Another manner of improving performance involves the conference server signaling other participants of the conference that are not most active, to cause the other participants to stop communicating stream information to the conference server. This may involve the conference server signaling the other participants to stop communicating video stream information, while continuing to receive audio information from the other participants and processing the audio information to determine the most active participant.

Yet another manner of improving performance may involve synchronizing all conference participants to use a same encryption key, and passing one or more streams from the conference participants through a conference server without performing a decryption and re-encryption of the streams. The encryption key of one or more existing conference participants may be provided to a newly joined conference participant. The conference server may also synchronize all conference participants to use a same decryption key. In this manner, the processing required by the conference server to decrypt and re-encrypt streams may be significantly reduced.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Audio/Video Conferencing System

Figure 1:
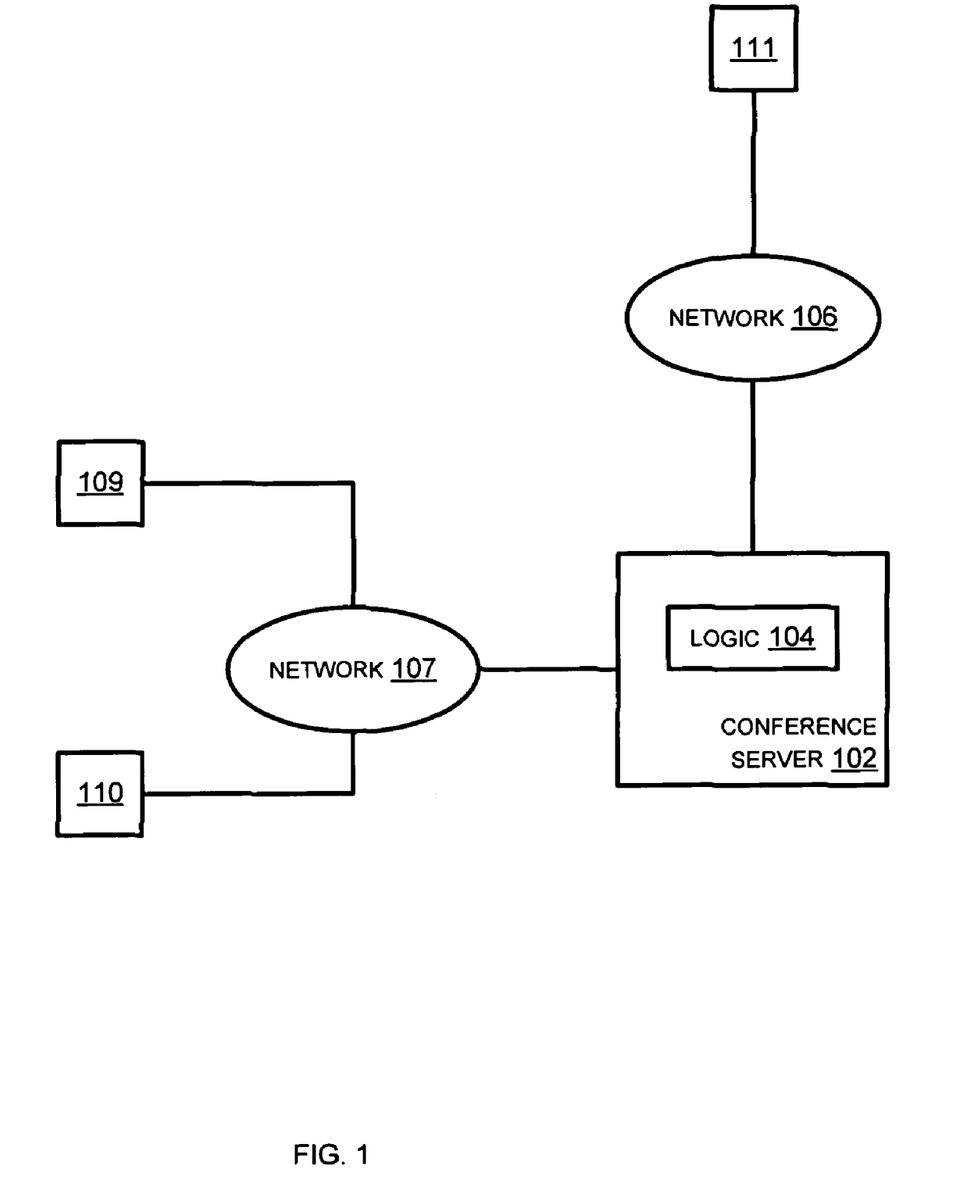
FIG. 1 is a block diagram of an embodiment of an audio-video conferencing system.

FIG. 1 is a block diagram of an embodiment of an audio/video conferencing system.

The system may comprise a conference server 102, a first network 106, a second network 107, and conference participant client devices 109, 110, and 111.

The conference server 102 (e.g. a multipoint conference server or MCU) enables multimedia communication between two or more conference participants 109-111. In a typical embodiment, participants each hear audio which comprises a mixture of audio coming from each client location. Audio mixing is typically performed by the conference server 102. Typically, the conference server 102 provides the mixed composite audio as an output sent to each of the participants 109-111. In some implementations, the most active participant's audio is not included in the audio mix that is communicated to the most active participant.

Additionally, several or all conference participants may view a video stream comprising video from one of the participant locations or possibly two or more of the locations. In a typical embodiment, all participants see the same video content, although presentation quality may vary for practical reasons such as bandwidth constraints between the conference server and the participant location. For example, if there is limited bandwidth available to a particular location, the video delivered to that location may comprise less resolution, fewer frames a second, or lower color content.

The video stream provided to conference participants may comprise video from one or more active conference locations. For example, there may be ten participant locations but one or more locations may be doing most of the talking. The conference server 102 may select the location(s) for which to present video based on who is talking loudest and/or is otherwise "most active" at a given moment. Alternatively, a conference moderator may select which participant video to present.

Conferencing may be provided in a secure manner by encrypting both the audio and video streams from the conference participants 109-111 to the conference server 102 and from the conference server 102 to the participants 109-111.

The participants 109-111 of an audio/video conference may connect to the conference server 102 using many different communications technologies. Connection over a network is most common. In FIG. 1, the conference server 102 is shown with connections to two networks. Although two networks are illustrated, the conference server 102 may support less or fewer network interfaces than this. The conference server 102 may support various communication interfaces and rates, for example from 19 kbps to 10 Gigabits a second or more. The two networks 106 and 107 may have different bandwidth capabilities to their respective participant devices 109-111. Thus, the conference server 102 may be called upon to perform bandwidth scaling of video and/or audio streams to the various participants.

The participant devices 109, 110 and 111 may comprise various technologies, such as personal computers, laptops, personal digital assistants (PDAs), cellular phones, or other devices with logic, processing, memory, and communications capabilities to support conferencing. If conferencing is performed in a secure manner the client device may support the encryption and decryption of the video and audio streams. Client devices may comprise specialized conferencing equipment, i.e., equipment that is built with a primary purpose of providing conferencing. For convenience, client devices may be referred to herein as conference participants rather than using the longer nomenclature conference participant devices. Depending on the context, the term 'conference participants' may refer to a device or to one or more persons using the device.

The conference server 102 may comprise logic 104 to perform various actions described herein.

Switching to a New Most Active Participant

Figure 2:
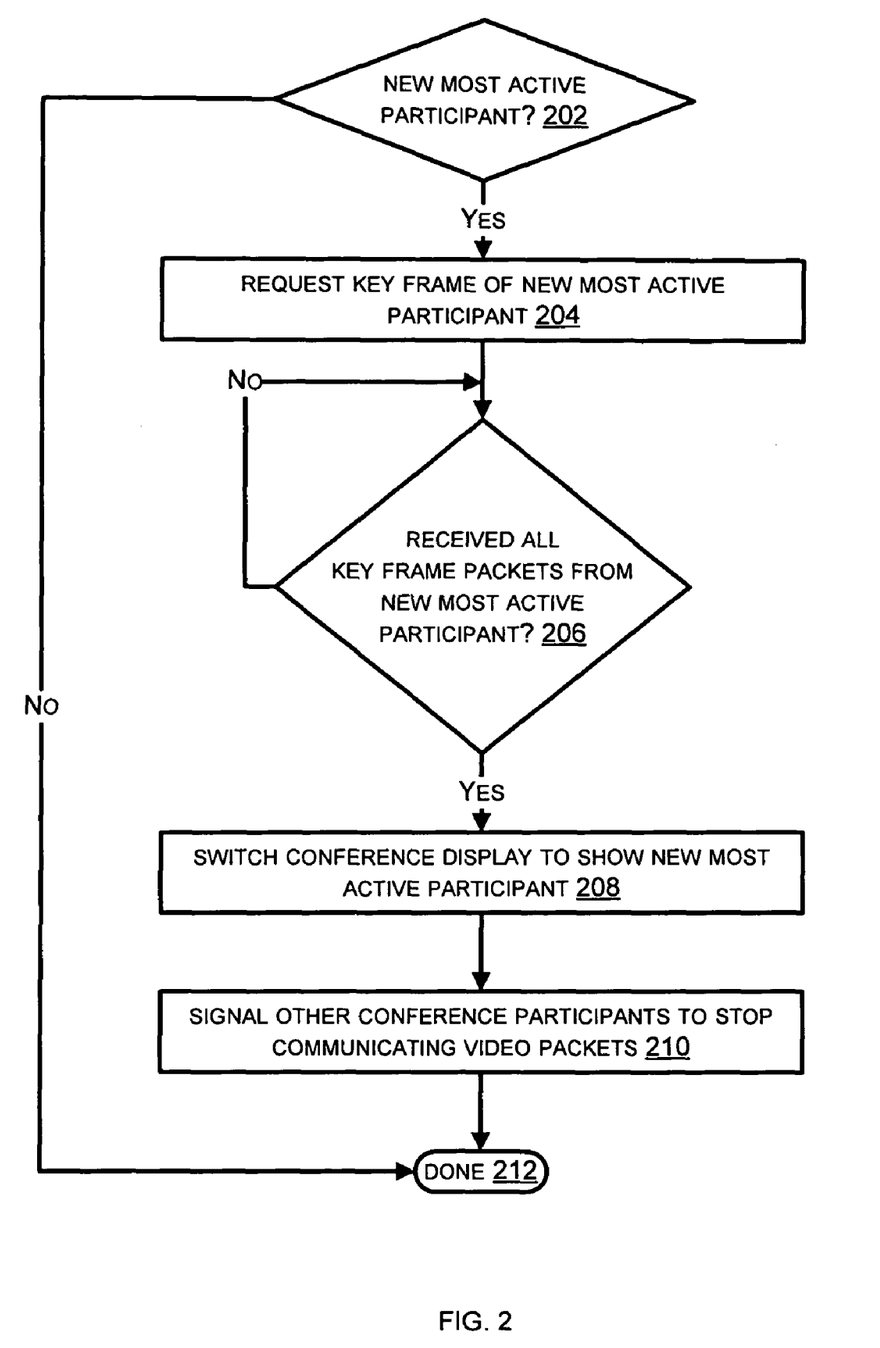
FIG. 2 is a flow chart of an embodiment of switching to a new most active participant.

FIG. 2 is a flow chart of an embodiment of switching to a new most active participant.

At 202 a determination is made whether there should be a new most active participant for the conference. If it is determined that there should be a new most active participant, at 204 the conference server requests a video key frame for the new most active participant. A video key frame is a complete frame of video that may be used as the basis for subsequent frames defined as differences relative to the key frame or preceding frames. For example, MPEG-2 (Motion Picture Experts Group publication ISO/IEC 13818) key frames may be referred to as 'I-frames', and subsequent frames defined as differences are referred to as 'P-frames'. The first P-frame sent subsequent to an I-frame is defined as the differences (which pixels changed) from the preceding I-frame. The next subsequent P-frame is defined as the differences from the preceding P-frame, and so on. A frame defined as differences from a preceding I-frame, with intervening P-frames, may be referred to as a 'Super P-frame'. The request for the key frame may be provided from the conference server to the client device of the participant identified as being the new most active participant.

At 206 the conference server determines if it has received the requested video key frame. If yes, at 208 the conference server switches the conference display (i.e. the output video stream) to show the new most active participant.

In some cases the most active conference participant may not receive the conference display, but may instead display a local version of the video produced by the most active conference participant camera(s). This may be done to conserve the resources utilized by conference server to receive and process the video stream from the most active participant, then to send the video stream back to the most active conference participant for display. However, the conference server may send the conference display to the most active participant in situations where the output video stream contains video for two or more participants or in some other manner differs in substance from the video stream being sent from the most active participant to the server (e.g. quad or split screen displays).

At 210 the conference server may signal one or more conference participants to stop communicating video packets in order to preserve communication and processing bandwidth. Typically, the conference participants are not signaled to stop sending audio packets. The conference server may continue to mix audio from all participants and to provide the mixed audio to all participants. The conference server may continue to process audio from all participants in order to determine if a switch to a new most active conference participant should be made.

At 212 the process concludes.

In some embodiments, multiple most active participants are selected. For example, the conference server may provide a conference display with a split screen showing two active participants.

At 202 it may be determined that there will be no new most active participants, or one, or potentially several new active participants. At 204, a key frame request may be sent to each new most active participant. At 206, the conference server determines if a new most active participant has provided all or substantially all of the key frame so that display of that participant's video may begin. At 208, the conference server presents video on the conference display for one or more new most active participants.

In some embodiments, at 210 the conference server may signal the one or more not most active conference participants to stop sending video P-frames but to continue sending at least I-frames at either their usual frequency or more infrequently. In that situation, the received I-frames may be cached by the conference server for possible later use during video switching.

Determining the Conference Participant for Video Display

Determining that a conference participant should become at least one most active participant may involve determining whether the conference participant is a most active talker of the conference. This may involve determining whether the conference participant is producing the greatest amount of audio energy of all or most participants over one or more fixed or variable measurement intervals. For example, two speakers may be highly active over an interval of two minutes, with one participant to be selected for display. If one is speaking more forcefully (louder) and thus provides an audio stream with the most energy, that individual's video may be selected for display. More than one measurement interval may be involved. For example, energy may be measured over some longer interval (such as the two minute example) but more weight may be given in the determination algorithm to energy measured in a shorter most recent interval (such as the last thirty seconds). The measurement interval may be selected to avoid switching so often than the conference participants viewing the video are annoyed by too frequent switches.

Another way to determine that the conference participant is a most active talker may involve determining whether the participant is speaking the most words of all or most other participants over one or more fixed or variable measurement intervals. For example, two speakers may be quite active over a measurement interval where one most active participant will be selected to have their video presented on the conference display. If the first speaker says the most words but softly, that person may be selected even though the other speaker had larger audio energy.

In some situations, determining that the conference participant should become at least one most active participant may simply involve determining that a conference moderator has selected the conference participant to display to other conference participants.

Accelerating the Display Switch to a New Conference Participant

The conference server may request a key frame from at least one conference participant in response to determining that the conference participant should become at least one most active participant. The conference server may make the conference participant the most active participant in response to receiving all or substantially all of the requested key frame from the conference participant.

In response to receiving all or substantially all of the requested key frame from the conference participant, the conference server may cause video of the conference participant to be seen by other conference participants.

Requesting a key frame from at least one conference participant may involve the conference server signaling the conference participant to provide the conference server with a video I-frame. The conference participant is expected to provide the I-frame without substantial delay, even if the conference participant is presently generating a video stream positioned on a P-frame or Super-P frame. In this manner, the switch to display of the new most active conference participant may be accelerated, because the conference server can display video of the new most active participant sooner, and need not wait for a key frame to occur during the natural course of the video stream of new most active conference participant.

In some embodiments, the conference server may buffer at least one key frame of at least one conference participant that is not the most active conference participant. The conference server may request a super-P frame from the at least one conference participant in response to determining that the conference participant should become at least one most active participant. Once the Super P-frame is received, it may be combined by the conference server with the buffered key frame in order to produce a video image of the conference participant. This video image may then be provided to the other conference participants. In this manner, the switch to display of the new most active conference participant may be accelerated, because the conference server can display video of the new most active participant sooner. In this case the conference server need not wait for a key frame to occur during the natural course of the video stream of new most active conference participant, but may instead combine the requested super-P frame with the buffered I-frame to produce displayable video of the new most active participant.

Some implementations may involve a peer-to-peer arrangement wherein one conference participant provides functionality of the conferencing server, and directs the activity of other participants to enable an audio/video conference. For example, one participant acting as a conferencing server may determine that another participant is most active, and may issue messages/signals to other participants to enable accelerated video switching as described herein. For example, the participant acting as the conferencing server for the session may instruct the current most active participant to stop sending video to the others, and signal the new most active participant to send and I-frame and start sending video. Also, or alternatively, the participant acting as the conferencing server may signal other participants to stop displaying video from the current most active participant, and start displaying video from the new most active participant.

The participant acting as the conferencing server, and/or the other participants, may interface with audio/video inputs and outputs, and/or the data produced thereby, using one or more interfaces as described in the patent application titled "Method and System for Providing and Interface Through Which an Application can Access a Media Stack", filed on May 9, 2005 as U.S. application Ser. No. 11/124,902, the contents of which are hereby incorporated by reference.

Preserving Processing and Communication Bandwidth

The conference server may signal other participants of the conference that are not most active to cause the other participants to stop communicating stream information to the conference server. This may preserve communication bandwidth and processing bandwidth on the server by, for example, relieving port drivers of the need to process unused incoming video packets.

The conference server may signal the other participants to stop communicating video stream information, but may continue to receive audio stream information from the other participants, and may process the audio information to determine the most active participant.

Switching to a New Most Active Participant

Figure 3:
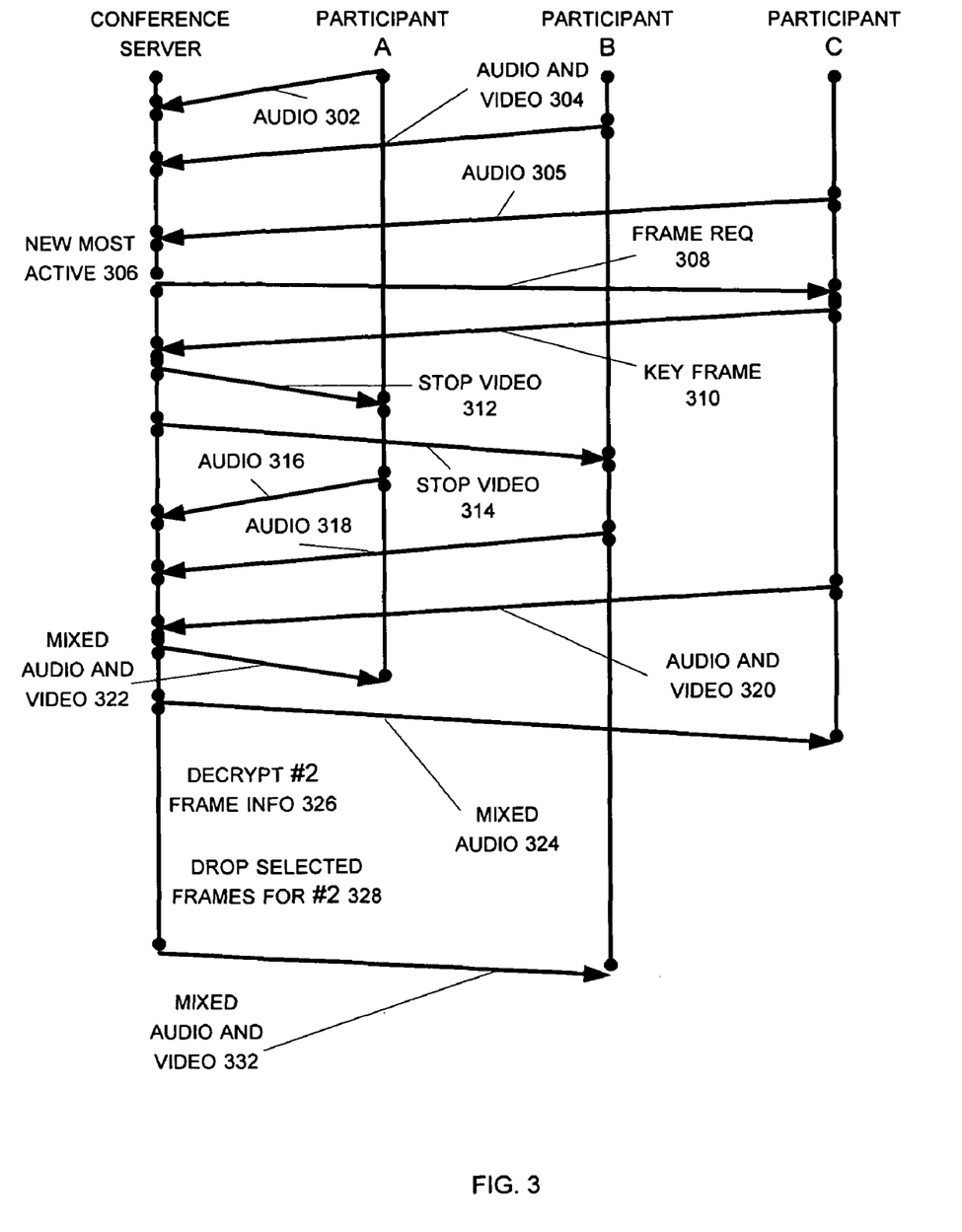
FIG. 3 is an action flow diagram of an embodiment of switching to a new most active participant.

FIG. 3 is an action flow diagram of an embodiment of a switching to a new most active participant. At 302 participant 'A' provides audio to the conference server. At 304 participant 'B' provides audio and video to the conference server and is the most active conference participant. At 306 participant 'C' provides audio to the conference server. Although illustrated sequentially for purposes of description, acts 302-306 may in fact occur substantially simultaneously.

At 306 participant 'C' is determined to be the new most active participant.

At 308 the conference server provides a frame request to participant 'C'. The frame request may be for an I-frame or, in some embodiments, a Super-P frame. Requesting the frame will also typically involve causing participant 'C' to start or restart the communication of its video stream.

At 310 participant 'C' provides a key frame to the conference server. At 312 the conference server provides a stop video signal to participant 'A'. In this example, participant 'A' has not at this point been sending video because participant 'A' was not the most active conference participant. Therefore, in some embodiments, the act of sending participant 'A' the stop video signal may not occur.

At 314 the conference server provides a stop video signal to participant 'B'. At 316 participant 'A' continues to provide an audio stream to the conference server, and at 318 participant 'B' continues to provide an audio stream to the conference server. Although illustrated sequentially for purposes of description, acts 316-318 may in fact occur substantially simultaneously.

At 320 participant 'C', the new most active participant, provides both audio and video streams to the conference server. The audio streams of participants 'A', 'B', and 'C' are decrypted, decoded, and mixed. A small amount of video frame information for participant 'B' is decrypted at 326 and the decrypted information is used at least to determine a type of the video frame. For example, a small amount of video 'metadata' information may be decoded and used to determine the frame type. The frame type information may be used at 328 to drop selected frames from the video stream provided to participant 'B' in order to provide bandwidth scaling, for example if participant 'B' is coupled to the conference server via a low-bandwidth link. Dropping video frames may also serve to prevent propagating errors as they are detected in the stream at the conference server.

For example, in some situations the frame type information may be ascertained from the first two bytes of the encrypted data. The time involved to decrypt a frame packet may involve the time to generate the per-packet decryption key, and the time to actually decrypt the packet. The second time is proportional to the amount of data to be decrypted. For SRTP (Secure Real-Time Transport Protocol) and many other forms of encryption, once the per-packet decryption key is known, the decryption is done bit by bit from the start of the data. This is because from the per-packet key a pseudo-random bit stream may be generated and XORed with the encrypted data in order to effect decryption.

In some embodiments, to get the frame type, the per-packet key is first generated. Then, rather than generate the pseudo-random stream for the length of the packet, it is generated instead for the first few bytes that contain the frame type (e.g. the first two bytes). Those two bytes may then be decrypted without decrypting the rest of the packet and without needing to generate the pseudo-random bitstream for the rest of the packet.

At 322 the conference server provides mixed audio and video to participant 'A'. At 324 the conference server provides mixed audio and video to participant 'B'. At 332 the conference server provides mixed audio to participant 'C' (video is not provided because participant 'C' is the most active conference participant and may display video locally). Although illustrated sequentially for purposes of description, acts 322-332 may in fact occur substantially simultaneously.

Synchronizing the Encryption/Decryption Keys of Conference Participants

Figure 4:
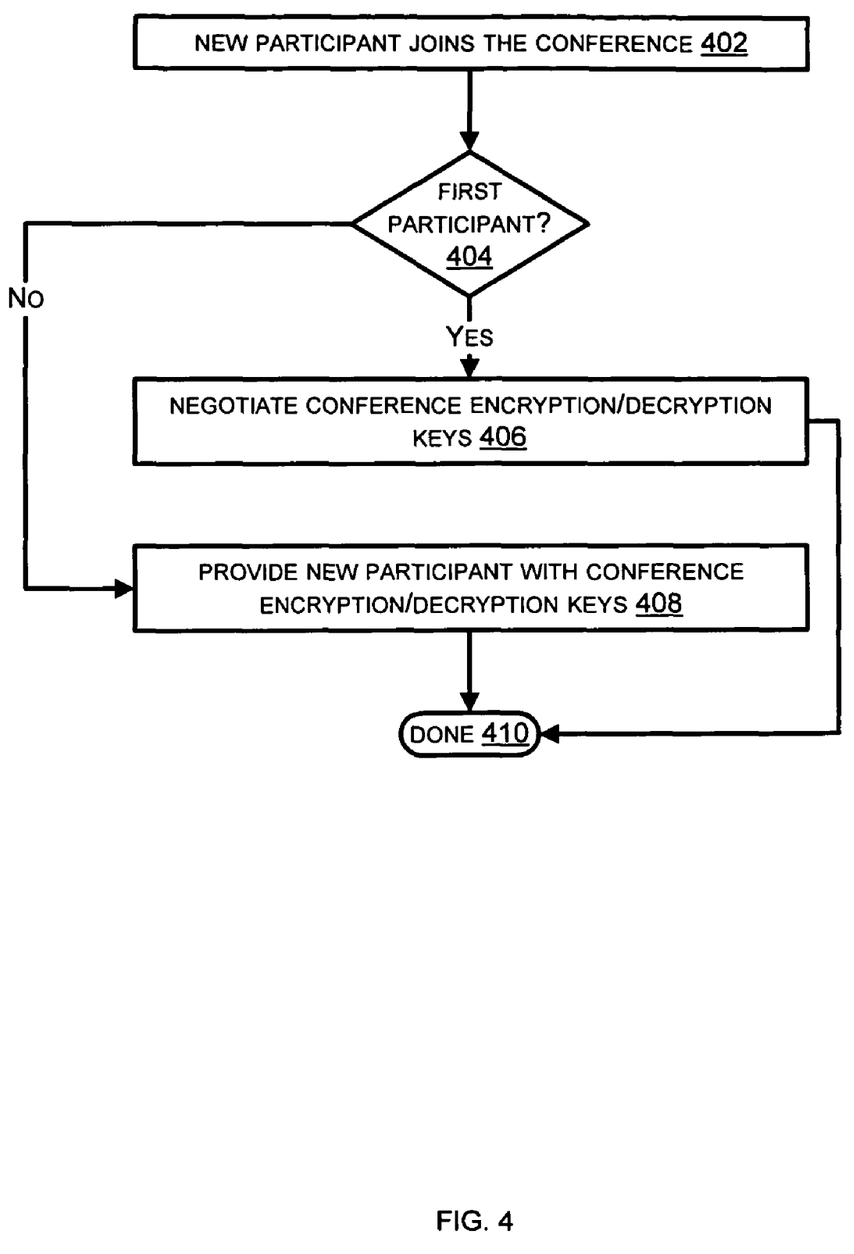
FIG. 4 is a flow chart of an embodiment of synchronizing the encryption-decryption keys of conference participants.

FIG. 4 is a flow chart of an embodiment of a processes for synchronizing the encryption/decryption keys of conference participants.

At 402 a new participant joins the conference. At 404 a determination is made as to whether the new participant is the first conference participant. If it is determined at 404 that the new participant is the first conference participant, conference encryption/decryption keys may be negotiated between the conference server and the new participant at 406. Otherwise at 408 the new participant is provided with encryption/decryption keys already in use by the conference server and existing participants. At 410 the process concludes.

Video Stream Pass Through to Preserve Processing Bandwidth

Processing bandwidth of the conference server may be preserved by synchronizing all conference participants to use a same encryption key, and passing one or more streams from the conference participants through a conference server without performing a decryption and re-encryption of the streams. Encryption and decryption are often processing-intensive operations, so that less encryption/decryption processing is progress towards preserving processing bandwidth.

Synchronizing of encryption keys may be facilitated by providing the encryption key of one or more existing conference participants to a newly joined conference participant. Key synchronization may be accomplished using various well-known key exchange protocols.

Conference participants may also be synchronized to use a same decryption key, for example by providing the decryption key of one or more existing conference participants to a newly joined conference participant.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

What is claimed is:

1. A method in a multi-participant video conference, comprising:
    a conference server receiving and processing audio information from all conference participants and receiving and processing a video stream comprising I-frames and P-frames from a first conference participant identified as a most active participant;
    the conference server providing a frame request for requesting an I-frame from a second conference participant that is not communicating a video stream in response to determining that the second conference participant should become the most active participant, the frame request causing the second conference participant to send an I-frame to the conference server and to start communicating a video stream comprising I-frames and P-frames;
    the conference server identifying the second conference participant as the most active participant in response to receiving an I-frame from the second conference participant;
    the conference server signaling the first participant to stop communicating P-frames but to continue sending I-frames;
    the conference server receiving and processing the video stream comprising I-frames and P-frames from the second participant identified as the most active participant;
    the conference server receiving and caching the I-frames received from the first participant;
    the conference server requesting a super-P frame from the first conference participant in response to determining that the first conference participant should become the most active participant again; and
    the conference server combining the super-P frame received from the first conference participant with a cached I-frame to produce a video image to be provided to the second conference participant.

2. The method of claim 1, further comprising:
    the conference server providing the video image to the second conference participant.

3. The method of claim 1, further comprising:
    the conference server determining that the second conference participant is a most active talker of the conference.

4. The method of claim 1, further comprising:
    the conference server decrypting only two bytes of each of one or more stream frame packets in order to determine a type of one or more stream frames provided by a participant identified as the most active participant; and
    the conference server dropping the one or more frames from the video stream provided by the participant identified as the most active participant in order to perform bandwidth scaling appropriate to one or more other conference participants.

5. The method of claim 4, further comprising:
    the conference server decrypting video metadata information to determine a type of stream frame provided by a participant identified as the most active participant.

6. The method of claim 4, comprising:
    the conference server dropping the one or more frames to provide an effectively lower bit rate for the video stream provided by the participant identified as the most active participant.

7. The method of claim 1, further comprising:
    the conference server signaling the second conference participant to stop communicating P-frames but to continue sending I-frames in response to identifying the first conference participant as the most active participant again.

8. The method of claim 1, further comprising:
    the conference server continuing to receive audio information from all conference participants and processing the audio information to determine a new most active participant.

9. The method of claim 1, further comprising:
    synchronizing all conference participants to use a same encryption key; and
    passing one or more streams from the conference participants through a conference server without performing a decryption and re-encryption of the streams.

10. The method of claim 9, wherein the synchronizing all conference participants to use a same encryption key further comprises:
    providing the encryption key of one or more existing conference participants to a newly joined conference participant.

11. The method of claim 1, further comprising:
    synchronizing all conference participants to use a same decryption key.

12. The method of claim 11, wherein the synchronizing all conference participants to use a same decryption key further comprises:
    providing the decryption key of one or more existing conference participants to a newly joined conference participant.

13. A computing device comprising a memory device storing a computer program and one or more processors for executing the computer program causing the computing device to perform a method in a multi-participant conference, the method comprising:
    the computing device receiving and processing audio information from all conference participants and receiving and processing a video stream comprising I-frames and P-frames from a first conference participant identified as a most active participant;
    the computing device providing a frame request for requesting an I-frame from a second conference participant that is not communicating a video stream in response to determining that the second conference participant should become the most active participant, the frame request causing the second conference participant to send an I-frame to the computing device and to start communicating a video stream comprising I-frames and P-frames;
    the computing device identifying the second conference participant the most active conference participant and in response to receiving an I-frame from the second conference participant;
    the computing device signaling the first conference participant to stop communicating P-frames but to continue sending I-frames;
    the computing device receiving and processing the video stream comprising I-frames and P-frames from the second participant identified as the most active participant;
    the conference server receiving and caching the I-frames received from the first conference participant;

the conference server requesting a super-P frame from the first conference participant in response to determining that the first conference participant should become the most active conference participant again; and the conference server combining the super-P frame received from the first conference participant with a cached I-frame to produce a video image to be provided to the second conference participant.

14. The computing device of claim 13, wherein the one or more processors executing the computer program causes the computing device to further perform:

the computing device signaling the second conference participant to stop communicating P-frames but to continue sending I-frames in response to making the first conference participant the most active conference participant again; and the computing device receiving and caching the I-frames received from the second conference participant.

15. A recordable storage medium storing a computer program that, when executed by a conference server serving multiple conference participants, results in:

the conference server receiving and processing audio information from all conference participants and receiving and processing a video stream comprising I-frames and P-frames from a first conference participant identified as a most active participant;

the conference server providing a frame request for requesting an I-frame from a second conference participant that is not communicating a video stream in response to determining that the second conference participant should become the most active participant, the frame request causing the second conference participant to send an I-frame to the conference server and to start communicating a video stream comprising I-frames and P-frames;

the conference server identifying the second conference participant as the most active participant in response to receiving the I-frame from the second conference participant;

the conference server signaling the first participant to stop communicating P-frames but to continue sending I-frames;

the conference server receiving and processing the video stream comprising I-frames and P-frames from the second participant identified as the most active participant; and the conference server receiving and caching the I-frames received from the first participant;

the conference server requesting a super-P frame from the first conference participant in response to determining that the first conference participant should become the most active participant again; and the conference server combining the super-P frame received from the first conference participant with a cached I-frame to produce a video image.

16. The storage medium of claim 15 wherein the computer program, when executed by the conference server, further results in:

the conference server decrypting only two bytes of each of one or more stream frame packets in order to determine a type of one or more stream frames provided by a participant identified as the most active participant; and the conference server dropping the one or more frames from the video stream provided by the participant identified as the most active participant in order to perform bandwidth scaling appropriate to one or more other conference participants.

17. The storage medium of claim 16 wherein the computer program, when executed by the conference server, further results in:

the conference server decrypting video metadata information to determine a type of stream frame provided by a participant identified as the most active participant.

18. The storage medium of claim 16 wherein the computer program, when executed by the conference server, further results in:

the conference server dropping the one or more frames to provide an effectively lower bit rate for the video stream provided by the participant identified as the most active participant.

19. The storage medium of claim 15 wherein the computer program, when executed by the conference server, further results in:

the conference server signaling the second conference participant to stop communicating P-frames but to continue sending I-frames in response to identifying the first conference participant as the most active participant again.

20. The storage medium of claim 15 wherein the computer program, when executed by the conference server, further results in:

the conference server facilitating synchronization of use of a same encryption key by conference participants; and the conference server passing through one or more streams from the conference participants without performing a decryption and re-encryption of the streams.

* * * * *